June 7, 1938.  A. B. FULLER  2,119,846
CONTROL DEVICE FOR A PHOTOGRAPHIC APPARATUS
Filed April 22, 1937
Fig. 1.
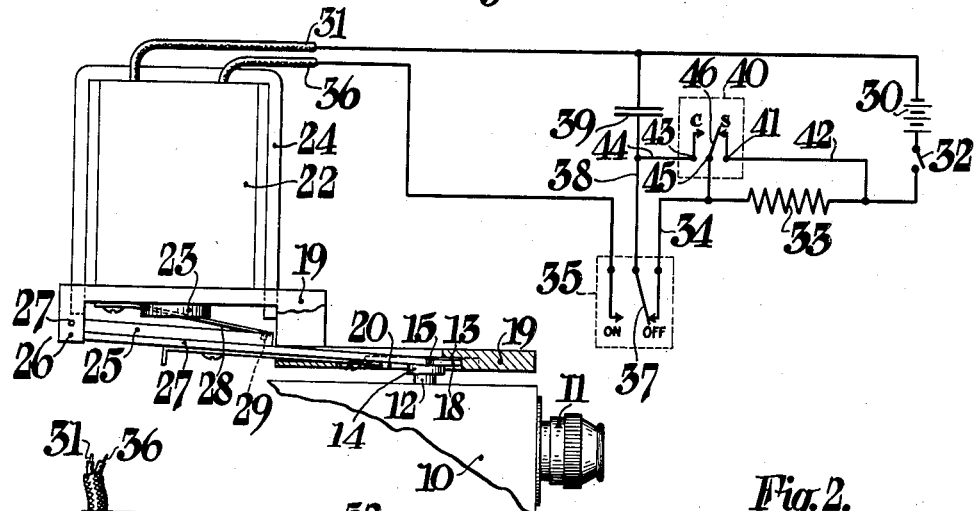
Fig. 2.
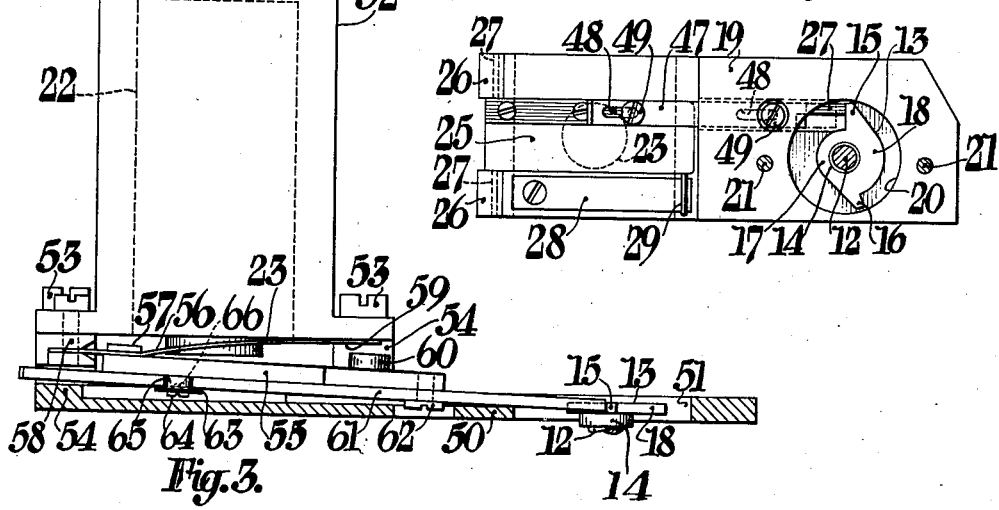
Fig. 3.
Fig. 4.
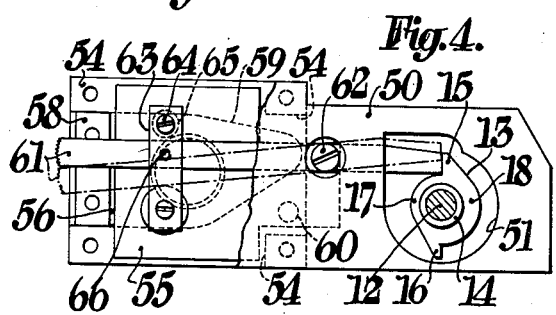
Albert B. Fuller,
INVENTOR
N. M. Perkins
George A. Gillette, Jr.
ATTORNEYS.

Patented June 7, 1938

2,119,846

UNITED STATES PATENT OFFICE 2,119,846

CONTROL DEVICE FOR A PHOTOGRAPHIC APPARATUS

Albert B. Fuller, Rochester, N. Y., assignor to Eastman Kodak Company, Rochester, N. Y., a corporation of New Jersey Application April 22, 1937, Serial No. 138,393

12 Claims. (Cl. 188—1)

The present invention relates to improvements in a control device for motion picture apparatus and is a continuation in part of my copending application, Serial No. 733,600, filed July 3, 1934, for "Motor drive for motion picture cameras."

Electro-magnetic control devices have been previously used in the motion picture art but have been restricted to controlling apparatus for bursts of pictures rather than for single pictures or time exposures.

The primary object of the present invention is the provision in the energizing circuit for an electro-magnetic control member of a condenser which may discharge through the electro-magnetic member and only momentarily energize the same.

Another object of the invention is the provision of a blocking member for a clutch on the motion picture apparatus and which blocking member under the control of the aforementioned electro-magnetic member may momentarily move the blocking member out of engagement with the clutch member on the apparatus.

A further object of the invention is the provision of a charging circuit for impressing a charge upon the condenser which is to discharge through the aforementioned electro-magnetic control member and of switch means which permit disconnection of the charging circuit from the condenser simultaneously with the connection of the condenser to the electro-magnetic member for discharging therethrough.

A still further object of the invention is the provision of a switch member which will supervise the charging and energizing circuits so that the aforementioned electro-magnetic member may be either momentarily energized or may be continuously energized for a desired interval.

A still further object of the invention is the provision upon the blocking member for engaging the clutch on the apparatus of an arm which is movable to either of two positions for supervising engagement of the blocking member with either of a pair of projections on the clutch or with only one of them. Other and further objects of the invention will be suggested to those skilled in the art by the following description.

The above and other objects of the invention are embodied in a control device which includes a blocking member for a clutch on motion picture apparatus, an electro-magnetic member for operating the blocking member which normally engages said clutch member and a condenser which may discharge through the electro-magnetic member and momentarily disengage the blocking member. A charging circuit is arranged for exclusively charging the aforementioned condenser or for charging the condenser and impressing a holding current upon the electro-magnetic member for continuous operation of the apparatus. A movable arm or guide may be provided on the blocking member to supervise engagement of the blocking member with the clutch member on the apparatus.

Reference is hereby made to the accompanying drawing wherein similar reference characters designate similar elements and wherein:

Fig. 1 is a wiring diagram of the control circuits and a plan view of the control device with a fragmentary section through the base member thereof.

Fig. 2 is a side view of the control device according to the invention.

Fig. 3 is a plan view of a modified form of the control device with a section taken through the base member.

Fig. 4 is a side view of the control device of Fig. 3 with a section broken away for better illustration of the blocking member.

The control arrangement according to the invention is illustrated as applied to a motion picture camera but may also be applied to other types of motion picture apparatus. Said motion picture camera 10 is equipped with an objective 11 and includes an operating shaft 12 which tends to rotate either by reason of a spring motor or tendency drive, not shown, but connected thereto in a recognized manner.

A clutch member 13 is mounted upon said operating shaft 12 and includes an integral and cylindrical sleeve 14 making a driving fit with camera operating shaft 12, a pair of oppositely located projections 15 and 16, and a pair of intermediate arcuate portions 17 and 18. Arcuate portion 17 is provided on one side of clutch member 13 between the projections 15 and 16 and arcuate portion 18 is provided on the other side of clutch member 13 also between the projections 15 and 16 but is greater in radial extent than said intermediate arcuate portion 17.

A base member 19 is provided with an opening 20 which receives the clutch member 13. Said base member 20 may be mounted upon the camera 10 by a pair of bolts 21.

An electro-magnetic member comprises a coil 22 surrounding a core 23 and mounted upon said base member 19 by means of a stirrup 24. A blocking means or member which normally engages said clutch member 13 is also mounted upon the base member 19. Said blocking member comprises an armature 25 which is pivotally mounted between bearings 26 of base member 19 by pintles 27. An abutment 27 is mounted upon armature 25 and extends along base member 19 into the opening 20 therein. A leaf spring 28 is also mounted on base member 19 and bears against a pin 29 depending from armature 25 so that the free end of abutment 27 is normally moved into engagement with either of the projections 15 and 16 on clutch member 13.

The energizing and control circuits are illustrated in Fig. 1. The source of electrical energy is a battery 30 which is preferably of the type generally used for flash lights. One side of battery 30 is connected directly by a wire 31 to one side of coil 22 of the electro-magnet. The other side of battery 30 is connected through a switch 32 to one end of a resistor 33. The other end of resistor 33 is connected by a lead 34 to one side of a single pole double throw switch 35. Switch 35 may be of the push button type and is preferably held normally in the position designated "off" as shown in Fig. 1. The other side of switch 35 which corresponds to the "on" position thereof is connected by a lead 36 to the other side of coil 22 of the electro-magnetic member. The switch arm 37 of switch 35 is connected by a lead 38 to one side of a fixed condenser 39, the other side of condenser 39 being connected to the wire 31 between battery 30 and coil 22.

A second single pole double throw switch 40 has an outside pole 41 connected by a wire 42 to a point between the battery 30 and resistor 33 while the other outside pole 43 of switch 40 is connected by a wire 44 to the lead 38 between fixed condenser 39 and the switch arm 37 of switch 35. The center pole 45 of switch 40 is connected to the lead 34 between resistor 33 and the "off" side of switch 35. While switch arm 37 of switch 35 is normally held in the "off" position the switch arm 46 of switch 40 may remain either in contact with the outside pole 41, designated as position "S" or may be moved into contact with the other outside pole 43 which position is designated as "C".

The operation of the electrical circuit just described is as follows: Upon closure of switch 32 and with switch arms 37 and 46 in the positions shown in Fig. 1, the condenser 39 is charged by the battery 30 through the outside pole 41 of switch 40 and through the "off" position of switch 35, the resistor 33 being shunted by the wire 42. The leads to switch 35 may be of any length to permit remote location thereof. Upon movement of switch arm 37 to the "on" position, the condenser 39 is connected across the electro-magnetic coil 22, core 23 is magnetized and armature 25 is attracted against the action of leaf spring 28.

Condenser 39 and the electro-magnetic member are designed so that the discharged current from condenser 39 only momentarily energizes coil 22 sufficiently to attract the armature 25. Consequently upon such energization of coil 22, armature 25 is moved to disengage abutment 27 from the projection 15 on clutch member 13.

After said discharge of condenser 39 and the momentary energization of core 23, the leaf spring 28 predominates and returns the armature 25 and abutment 27 to engaging position and this return takes place so rapidly that the abutment 27 may engage the other projection 16 of clutch member 13. Said projection 16 on the clutch member is so located with respect to the camera mechanism that the camera shutter is in open position when abutment 27 and projection 16 are in engagement. Irrespective of the length of time that switch arm 27 is held in the "on" position, coil 22 and core 23 are only momentarily energized.

Upon release of the push button or switch arm 37, said arm 37 returns to normal position and a charging circuit through a portion of wire 31, battery 30, switch 32, wire 42, pole 41, switch arm 46 of switch 40, center pole 45, lead 34, switch arm 37, and lead 38 is established across condenser 39. Since movement of switch arm 37 from the "off" to the "on" position disconnects this charging circuit from condenser 39, the electro-magnetic member receives only a single impulse designated by the letter "S" on switch 40. Upon the next operation of switch arm 37, coil 22 and core 23 are again temporarily energized by condenser 29 to disengage abutment 27 and projection 16, abutment 27 again being immediately returned for engagement with projection 15.

The control device of the invention is also adapted to permit a single complete cycle of operation of the camera. For this purpose a guide 47 is provided with elongated slots 48 and is slidably mounted upon abutment 27 by a pair of screws 49. With guide 47 in the position shown in Fig. 2, the operation of the control device will be as just described. However, when guide 47 is slid into the position indicated by the dot dash lines in Fig. 2, the operation of the control device is modified. With the end of abutment 27 in engagement with projection 15 of clutch member 13 and upon temporary energization of coil 22 by condenser 39, upon closure of switch 35, the clutch member 13 will be rotated. The coil 22 and core 23 are only temporary or momentarily energized by condenser 39 so that spring 28 almost immediately endeavors to return abutment 27 for engagement with the other projection 16. However, guide 47 now rides upon the intermediate arcuate portion 18 of greater radial extent and prevents the return of abutment 27 by spring 28 until after projection 16 has passed the end of abutment 27. The intermediate arcuate portion 17 of smaller radius will permit the return of abutment 27 for engagement with projection 15. Thus, a single closure of switch 35 effects a complete cycle of the camera and the exposure for the usual period of a single picture.

If the camera 10 is to be operated continuously, the switch arm 46 is moved to the position designated "C". The condenser 39 is now charged by battery 30 through resistor 33. Upon closure of switch arm 37, the condenser 39 is connected across the coil 22 but in addition the battery 30 is also connected across coil 22 through the resistor 33. As a result, the coil 22 is initially energized by the combined effects of battery 30 and condenser 39. This relatively large initial energization is necessary for the original attraction of armature 25 and abutment 27. After the discharge of condenser 39, the coil 22 and core 23 continue to be energized sufficiently to hold the armature 25 in attracted position but such energization is now supplied by the difference in potential across battery 30 less the voltage drop across resistor 33. Under this last condition, the coil 22 is energized sufficiently to hold abutment 27 out of engagement with clutch member 13 against the action of spring 28 by the energy drawn from the battery 30. Obviously this arrangement for utilizing a smaller holding current during a continuous operation of the apparatus substantially prolongs the life of battery 30.

The subject matter thus far disclosed and described corresponds exactly with that previously disclosed and described in my aforementioned pending application. The new modification introduced by this continuation in part will now be described.

Such new modification consists primarily in a simpler and more advantageous construction of the blocking member and particularly the arm or abutment for engaging the clutch member 13. The base member 50, see Figs. 3 and 4, is provided with an opening 51 within which clutch member 13 may rotate. The coil 22 and core 23 are mounted within a casing 52 which is connected by bolts 53 to spaced supports 54 of base member 50. Coil 22 may be connected to the energizing and control circuits as before through wire 31 and lead 36.

The blocking member comprises an armature 55 mounted in magnetic relationship to core 23 by a plate spring 56 attached to armature 55 by rivets 57, having one end engaged by a clamp 58 on casing 52 and having the other end in the form of a spring arm 59 for holding the armature normally spaced from core 23. A stop 60 is mounted on armature 55 for abutment against casing 52 to limit the attracted movement of the armature 55.

An arm 61 is pivotally mounted on armature 55 by means of a headed stud 62. Said arm is movable to either of two positions one of which is illustrated in Fig. 4, and is maintained in either of these positions by a spring 63 mounted by screw 64 and collars 65 to straddle arm 61. A pimple 66 is provided in spring 63 for frictional engagement with arm 61 to hold it in either position.

With arm 61 in the position shown in Fig. 4, and upon energization of coil 22 and core 23, said arm will be moved out of engagement with the projection 15 and can only return under the action of spring arm 59 for engagement with said projection 15. The action of the intermediate arcuate portion 18 of greater radial extent being the same as before to prevent engagement of arm 61 with the projection 16. However, when arm 61 is rotated to the position indicated by the dot dash lines in Fig. 4, the end of arm 61 will clear the periphery of said arcuate portion 18 of greater axial extent and the arm may engage with projection 15 or 16. This function of the blocking member is quite similar to that shown in the other form of Figs. 1 and 2 but is merely more convenient and rugged from a production standpoint.

Since many modifications of the present invention are possible, the present disclosure is to be construed in an illustrative and not in a limited sense. The scope of the invention is defined in the appended claims.

What I claim is:

1. In a control device for a photographic apparatus, the combination with an operating shaft on said apparatus and tending to rotate, a clutch member on said shaft and having a pair of oppositely located projections, a blocking means normally engaging either of the projections on said clutch member, and an electro-magnetic member in magnetic relation to said blocking member, of an energizing means including a condenser adapted to discharge through said electro-magnetic member, momentarily to move said blocking means out of engagement with one of said projections on said clutch member, and then permitting return of said blocking means to engage the other projection on said clutch member.

2. In a control device for a photographic apparatus, the combination with an operating shaft on said apparatus and tending to rotate, a clutch member on said shaft and having a pair of oppositely located projections, a blocking means normally engaging either of the projections on said clutch member, and an electro-magnetic member in magnetic relation to said blocking member, of a condenser, a charging circuit including a source of electrical energy, a discharging circuit including said electro-magnetic member, and a switch means connected to said condenser, for disconnecting said condenser from said charging circuit and for connecting said condenser to said discharging circuit momentarily to move said blocking means out of engagement with one of said projections and then permitting return of said blocking means to engage the other projection on said clutch member.

3. In a control device for a photographic apparatus, the combination with a clutch member on said apparatus, a blocking means movable into engagement with said clutch member, and an electro-magnetic member adjacent said blocking means for operating the same, of an energizing means including a condenser adapted to discharge through said electro-magnetic member for operation of said blocking means.

4. In a control device for a photographic apparatus, the combination with a clutch member on said apparatus, a blocking means normally engaging said clutch member, and an electro-magnetic member adjacent said blocking means and adapted upon energization to move said blocking means out of engagement with said clutch member, of an energizing means including a condenser adapted to discharge through said electro-magnetic member which is then energized to move said blocking means out of engagement with said clutch member.

5. In a control device for a photographic apparatus, the combination with a clutch member on said apparatus, a blocking means movable into engagement with said clutch member, and an electro-magnetic member adjacent said blocking means for operating the same, of a condenser, a charging circuit including a source of electrical energy, a discharging circuit including said electro-magnetic member, and a switch means for completing said discharging circuit to said electro-magnetic member, said condenser discharge energizing said electro-magnetic member to move said blocking means out of engagement with said clutch member.

6. In a control device for a photographic apparatus, the combination with a clutch member on said apparatus, a blocking member movably mounted and normally in engagement with said clutch member, and an electro-magnetic member in operative relation to said blocking member, of a condenser, a charging circuit including a source of electrical energy, a discharging circuit including said electro-magnetic member, and a switch means connected to said condenser, for disconnecting said condenser from said charging circuit and for connecting said condenser to said discharging circuit.

7. In a control device for a photographic apparatus, the combination with a clutch member on said apparatus, a blocking member movably mounted and normally in engagement with said clutch member, and an electro-magnetic member in operative relation to said blocking member, of a condenser, a charging circuit including a source of electrical energy, a discharging circuit including said electro-magnetic member, and a switch means connected to said condenser, for disconnecting said condenser from said charging circuit and for connecting said condenser to said discharging circuit, the discharge of said condenser being such as to momentarily energize said electro-magnetic member for momentary disengagement of said blocking member and clutch member.

8. In a control device for a photographic apparatus, the combination with a clutch member on said apparatus, a blocking member movably mounted and normally in engagement with said clutch member, and an electro-magnetic member in operative relation to said blocking member, of a condenser, a charging circuit including a source of electrical energy, and a resistor, a discharging circuit including said electro-magnectic member, and a switch means connected to said condenser and for connecting said condenser and said charging circuit to said electro-magnetic member for comparatively high and momentary energization thereof from said condenser and for lower and continuous energization from said charging circuit.

9. In a control device for a photographic apparatus, the combination with a clutch member on said apparatus, a blocking member movably mounted and normally in engagement with said clutch member, and a solenoid in operative relation to said blocking member, of a switch means including a pair of contacts and an arm normally held in engagement with one of said contacts, a condenser having one side connected to said switch arm and the other side connected to said solenoid, a battery having one side connected to said one side of said condenser, a resistor having one end connected to the other side of said battery and having its other end connected to said one contact of said switch means, a shunt circuit across said resistor, a second switch means in said shunt circuit and for alternatively connecting said other side of the battery to said one side of said condenser, and a connection from said other contact of the first mentioned switch means to the other side of said solenoid.

10. In a control device for photographic apparatus, the combination with an operating shaft on said apparatus and tending to rotate, and a clutch member on said shaft and including a pair of oppositely located projections and a pair of intermediate arcuate portions, one of which is greater in radial extent than the other, of a blocking member normally in engagement with said clutch member and including an arm movable to either of two positions, and a solenoid in juxtaposition to said blocking member and adapted upon being energized to move said blocking member out of engagement with said clutch member, said arm in one position permitting return of the blocking member into engagement with either of said projections and said arm in the other position on said blocking member riding upon the intermediate arcuate portion of greater radial extent and permitting return of said blocking member for engagement with only one of said projections.

11. In a control device for a photographic apparatus, the combination with an operating shaft on said apparatus and tending to rotate, and a clutch member on said shaft and including a pair of oppositely located projections and a pair of intermediate arcuate portions, one of which is greater in radial extent than the other, of a blocking member movably mounted including an abutment normally in engagement with either of the projections on said clutch member and including a guide slidable upon said blocking member to either of two positions, and a solenoid adjacent said blocking member and adapted upon being energized to move the abutment of said blocking member out of engagement with said clutch member, said guide in one position engaging the intermediate arcuate portion of greater radial extent and permitting the return of said abutment for engagement with only one of said projections on the clutch member.

12. In a control device for a photographic apparatus, the combination with an operating shaft on said apparatus and tending to rotate, and a clutch member on said shaft and including a pair of oppositely located projections and a pair of intermediate arcuate portions, one of which is greater in radial extent than the other, of a blocking member normally in engagement with said clutch member and including an arm rotatably mounted on said blocking member and movable to either of two positions, and a solenoid adjacent said blocking member and adapted upon being energized to move the arm of said blocking member out of engagement with said clutch member, said arm in one position upon return of the blocking member engaging either of said projections and said arm in the other position on said blocking member riding upon the intermediate arcuate portion of greater radial extent and returning to engage only one of said projections on said clutch member.

ALBERT B. FULLER.